United States Patent
Connor et al.

(10) Patent No.: US 6,569,219 B1
(45) Date of Patent: May 27, 2003

(54) AIR FILTER WITH SERVICEABLE FILTER MEDIA

(75) Inventors: Michael J. Connor, Stoughton, WI (US); Kent J. Kallsen, Oregon, WI (US); Rebecca A. Beier, Madison, WI (US); Carl P. Harris, Evansville, WI (US); Mark V. Holzmann, Stoughton, WI (US); Robert A. Bannister, Stoughton, WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/854,366

(22) Filed: May 11, 2001

(51) Int. Cl.[7] .............................................. B01D 50/00
(52) U.S. Cl. ........................... 55/495; 55/490; 55/497; 55/498; 55/507; 55/510; 55/DIG. 5
(58) Field of Search ........................ 55/498, 502, 490, 55/510, 495, 497, 499, 507, DIG. 5; 210/493.1, 493.2, 493.5, 497.01; 264/DIG. 48

(56) References Cited

U.S. PATENT DOCUMENTS

| | | | |
|---|---|---|---|
| 2,919,807 A | | 1/1960 | Briggs |
| 3,209,520 A | | 10/1965 | McKinlay |
| 3,397,793 A | | 8/1968 | MacDonnell |
| 4,464,263 A | | 8/1984 | Brownell |
| 5,693,109 A | * | 12/1997 | Coulonvaux .................. 55/498 |
| 5,755,844 A | * | 5/1998 | Arai et al. ..................... 55/498 |
| 5,800,581 A | * | 9/1998 | Gielink et al. ................ 55/498 |
| 5,895,510 A | * | 4/1999 | Butler et al. .................. 55/490 |
| 5,954,849 A | * | 9/1999 | Berkhoel et al. ............. 55/498 |
| 6,015,452 A | * | 1/2000 | Nepsund et al. .............. 55/498 |
| 6,096,207 A | * | 8/2000 | Hoffman, Jr. et al. ........ 55/498 |
| 6,099,606 A | * | 8/2000 | Miller et al. .................. 55/498 |
| 6,110,248 A | * | 8/2000 | Liu ................................ 55/498 |
| 6,152,996 A | * | 11/2000 | Linnersten et al. ........... 55/497 |
| 6,299,661 B1 | * | 10/2001 | Bloomer ....................... 55/498 |
| 6,361,579 B1 | * | 3/2002 | Decker ......................... 55/317 |
| 6,379,433 B1 | * | 4/2002 | Scranton, Jr. ................. 55/412 |
| 6,440,191 B1 | * | 8/2002 | Berfield et al. ............... 55/492 |

* cited by examiner

Primary Examiner—David A. Simmons
Assistant Examiner—Minh-Chau T. Pham
(74) Attorney, Agent, or Firm—Andrus, Sceales, Starke & Sawall, LLP

(57) ABSTRACT

An air filter element has a cylindrical filter media sleeve axially slidable along and around an inner liner from either axial end of the sleeve. First and second end caps at distally opposite axial ends of the liner and sleeve each have a central aperture, the aperture in the first end cap providing air flow therethrough in communication with the hollow interior of the liner, the aperture in the second end cap retaining a closing cover. The cylindrical filter media sleeve extends axially along the inner liner and is axially retained between the cover and the first end cap. The cover is removably mounted to the second end cap in snap-in relation and axially retains the sleeve on the inner liner.

36 Claims, 6 Drawing Sheets

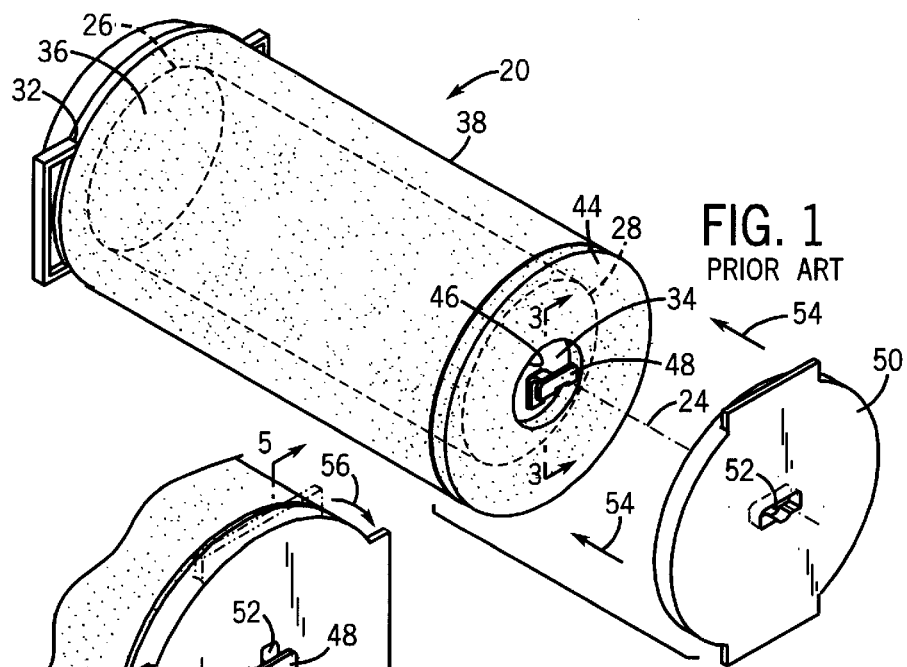
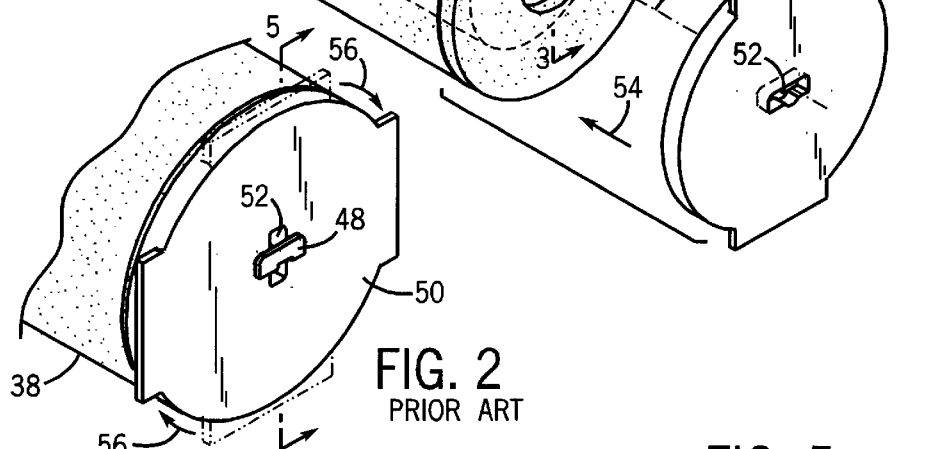
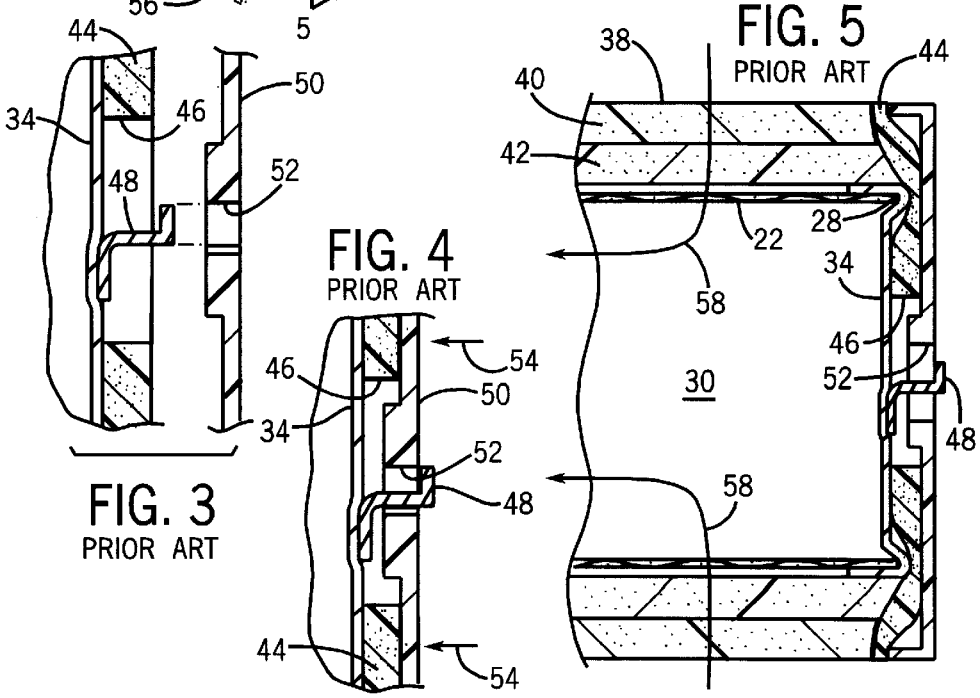
FIG. 1 PRIOR ART
FIG. 2 PRIOR ART
FIG. 3 PRIOR ART
FIG. 4 PRIOR ART
FIG. 5 PRIOR ART

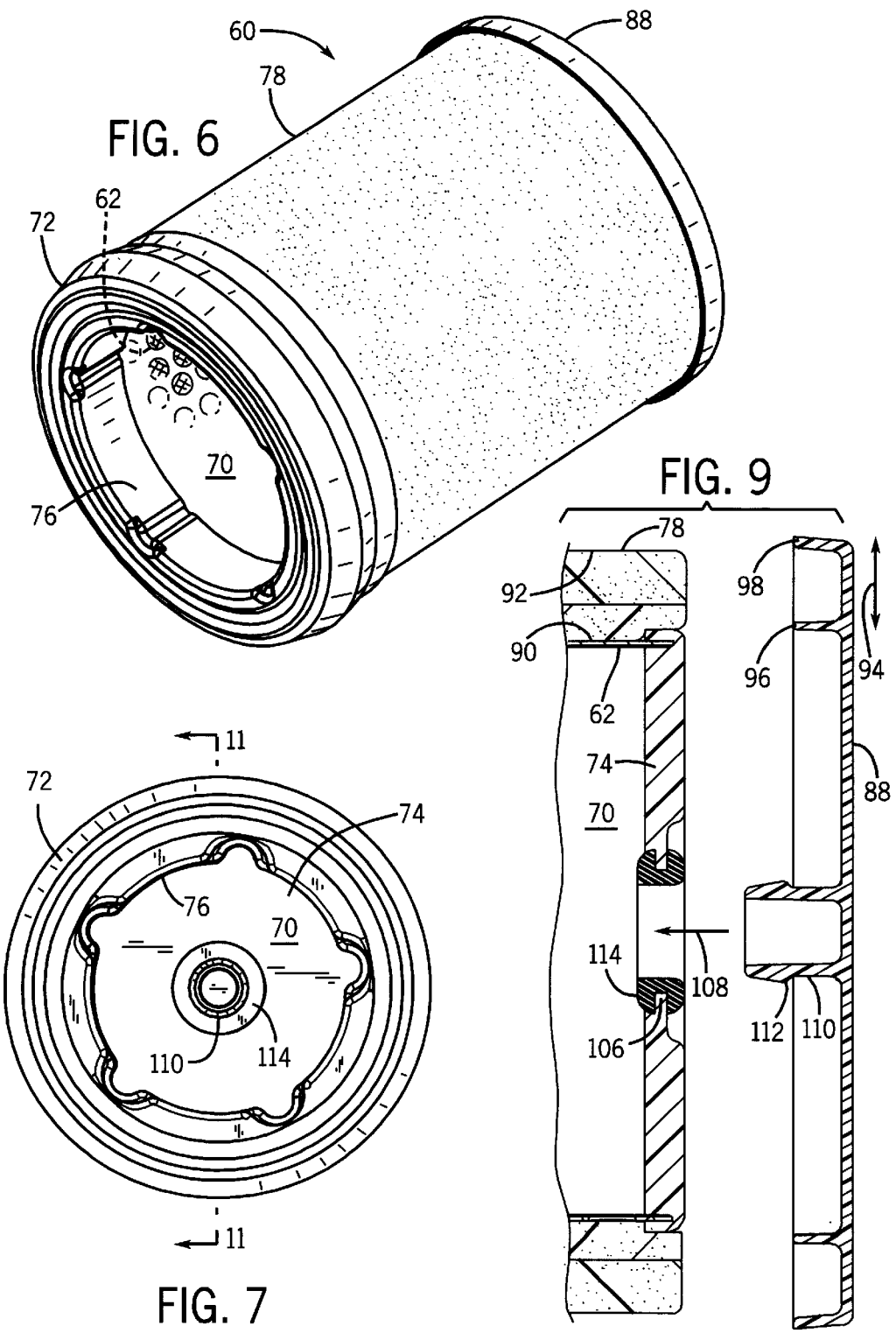

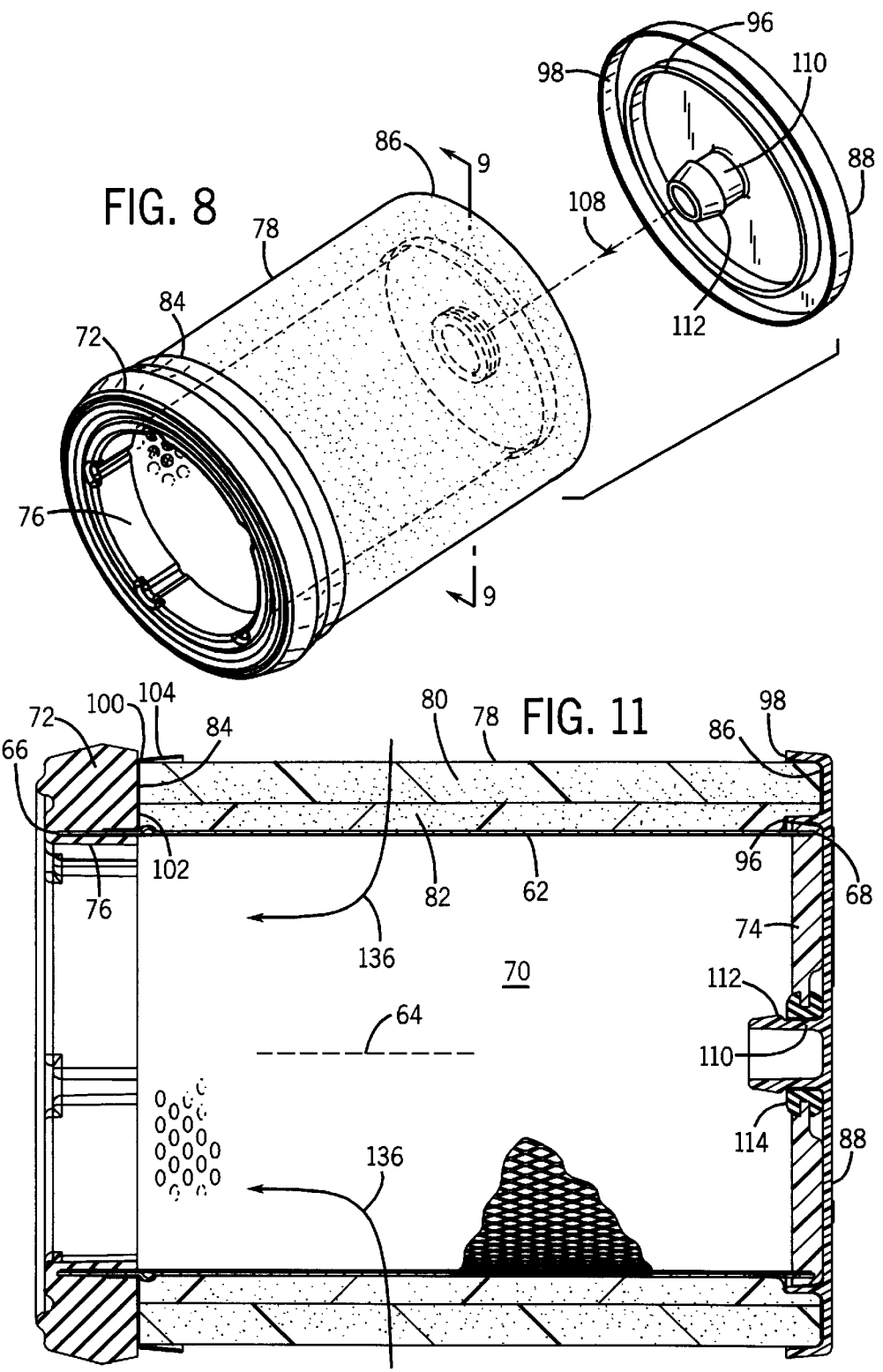

AIR FILTER WITH SERVICEABLE FILTER MEDIA

BACKGROUND AND SUMMARY

The invention relates to air filter elements, and more particularly to structure and methods facilitating servicing and replacement.

The invention arose during development efforts directed toward the servicing of engine intake air filters in recreational vehicle applications, especially in remote areas where replacement air filter elements are not readily available. Such filters have filter media, e.g. foam or the like, which can be removed and then cleaned if new replacement media is not at hand or available. Alternatively, the removed dirty media can be replaced by new media if available.

The present invention provides improvements reducing cost and providing easy servicing.

BRIEF DESCRIPTION OF THE DRAWINGS

Prior Art

FIG. 1 is an exploded perspective view of an air filter element known in the prior art.

FIG. 2 is a perspective assembled view of a portion of the structure of FIG. 1.

FIG. 3 is a sectional view taken along line 3—3 of FIG. 1.

FIG. 4 is an assembled view of the structure of FIG. 3.

FIG. 5 is a sectional view taken along line 5—5 of FIG. 2.

Present Invention

FIG. 6 is a perspective view of a filter element in accordance with the present invention.

FIG. 7 is an end elevation view of the filter element of FIG. 6.

FIG. 8 is an exploded perspective view of the structure of FIG. 6.

FIG. 9 is a sectional view taken along line 9—9 of FIG. 8.

Figure 10:
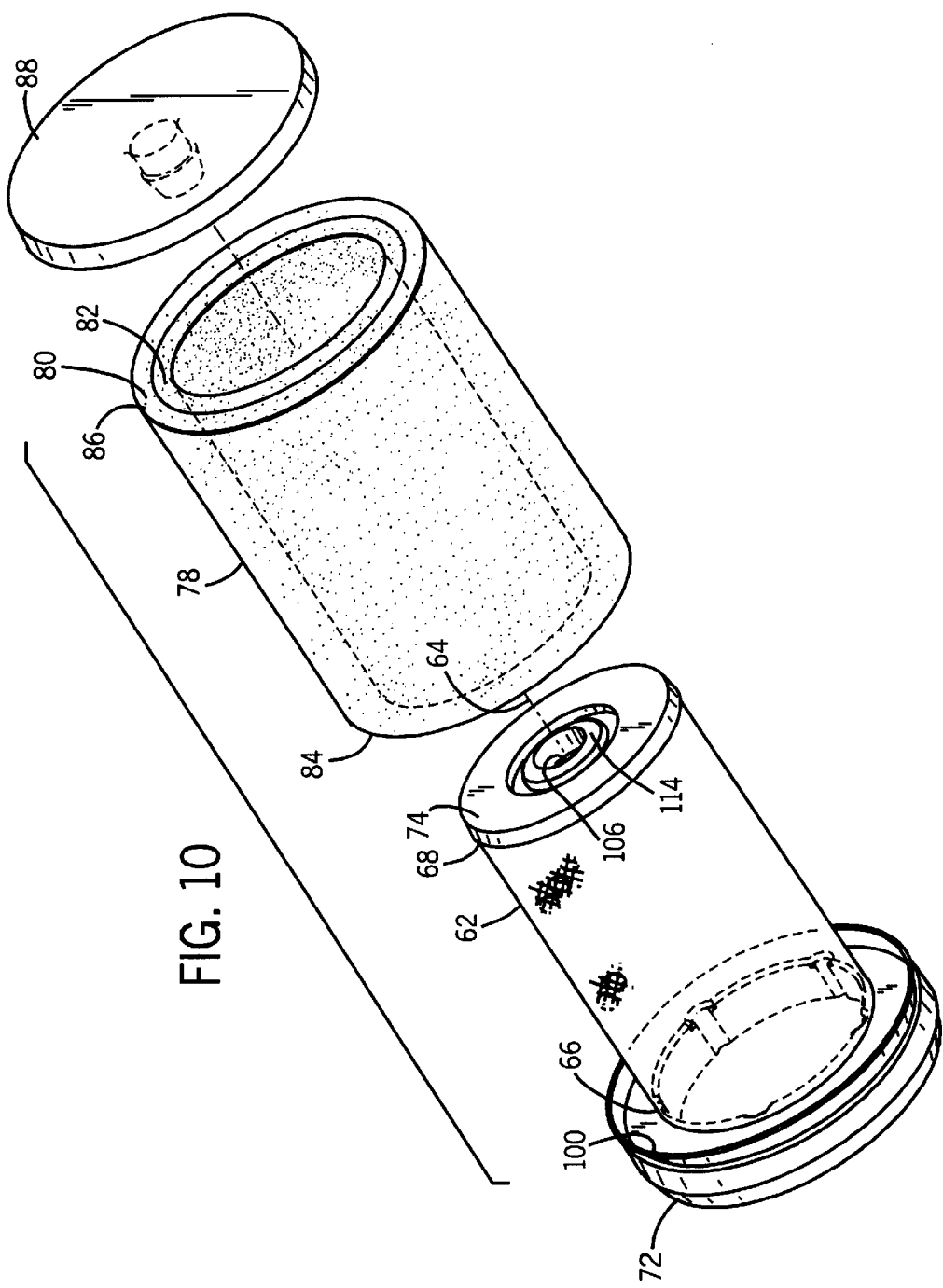

FIG. 10 is a further exploded perspective view of the structure of FIG. 6.

FIG. 11 is a sectional view taken along line 11—11 of FIG. 7.

Figure 12:
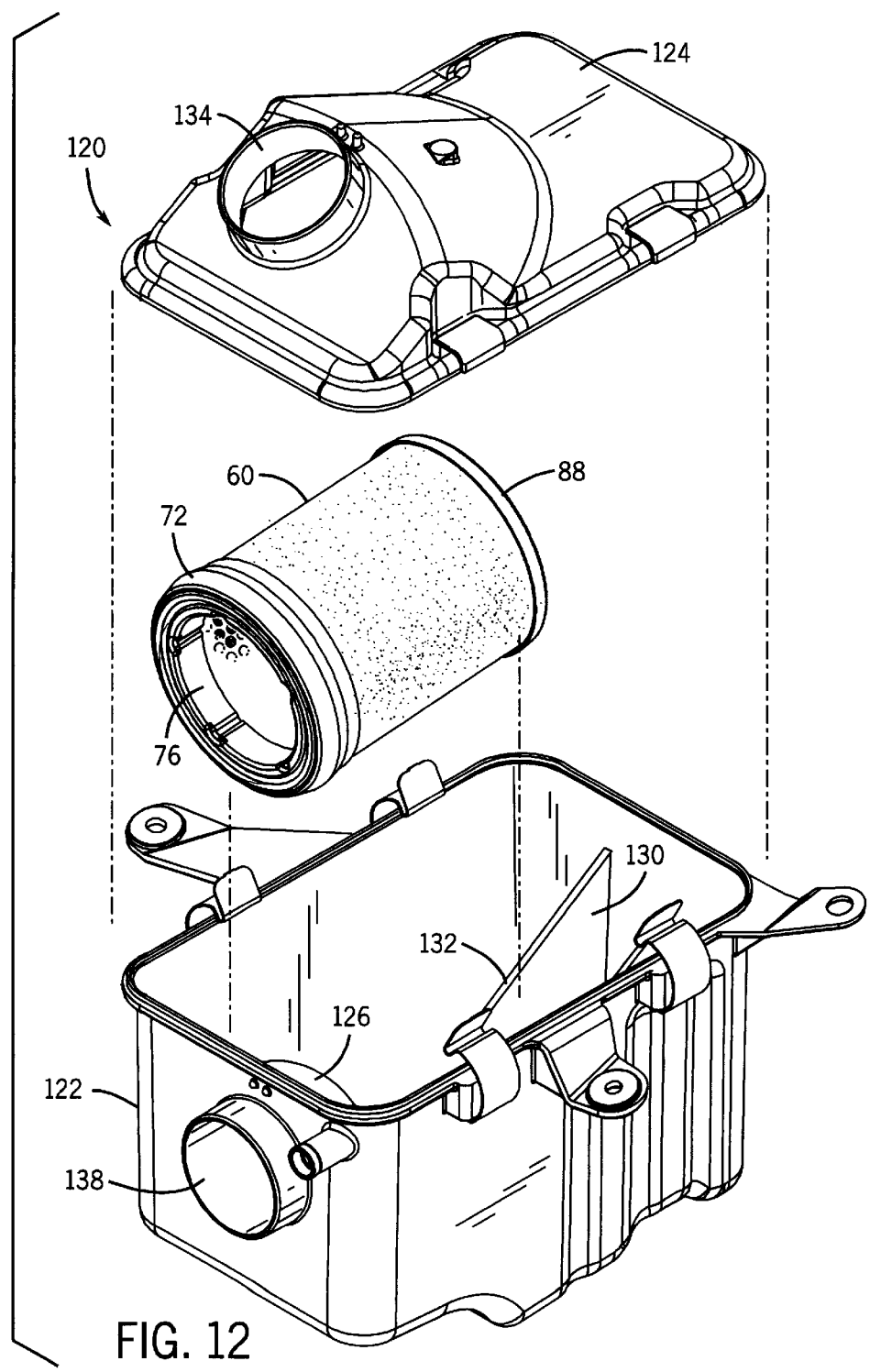

FIG. 12 is an exploded perspective view of a filter housing for the filter element of FIG. 6.

Figure 13:
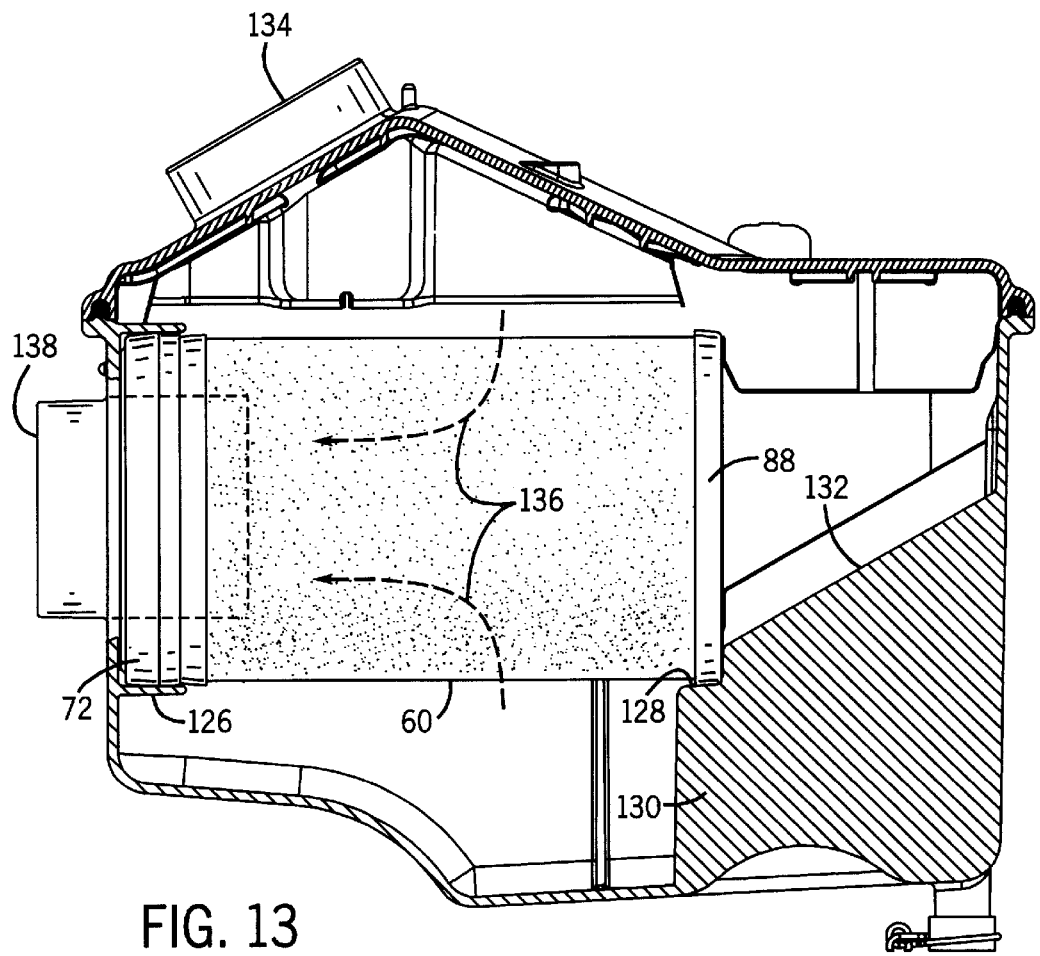

FIG. 13 is a sectional assembly view of the structure of FIG. 12.

DETAILED DESCRIPTION

Prior Art

FIGS. 1–5 show an air filter element 20 known in the prior art, including a cylindrical inner liner 22, FIG. 5, such as a wire screen or mesh or perforated metal, pervious to air flow and extending axially along an axis 24, FIG. 1, between distally opposite first and second axial ends 26 and 28 and having a hollow interior 30. First and second end caps 32, 34 are mounted to inner liner 22 at ends 26 and 28, respectively. The end caps are typically metal or plastic, for example end cap 32 is plastic and is sonically welded or adhesively bonded to inner liner 22, and end cap 34 is metal and is welded to inner liner 22. End cap 32 has a central aperture 36 providing air flow therethrough in communication with hollow interior 30. End cap 34 spans and closes hollow interior 30 at axial end 28 of liner 22. Filter media is provided by a cylindrical foam sleeve 38 which may have two layers 40 and 42 FIG. 5 and which is capped at one axial end by an annular foam disc 44 adhesively or otherwise bonded to sleeve 38. Disc 44 has a central aperture 46 through which extends a tab 48. Tab 48 is welded to end cap 34. A cover 50, e.g. plastic, has a central slotted aperture 52 and is removably mounted to end cap 34 by inserting cover 50 axially as shown at arrows 54, FIGS. 1, 4, onto end cap 34, with tab 48 extending through aperture 52, and then turning cover 50 as shown at arrows 56, FIG. 2, preferably 90° such that tab 48 straddles laterally across the outside of slotted aperture 52 such that cover 50 is retained on end cap 34, whereby cover 50 retains filter media 38 on inner liner 22. Air to be filtered flows radially inwardly through filter media 38 as shown at arrows 58, FIG. 5, and then axially within hollow interior 30 and exits through open end aperture 36, for example to supply clean filtered air to an internal combustion engine of a vehicle such as a recreational vehicle. This is commonly known as outside-in flow. Alternatively, air flow may be in the reverse direction, with dirty air entering open end aperture 36 and exiting radially outwardly through filter media 38, commonly known as inside-out or reverse flow.

To service air filter element 20, cover 50 is turned 90° as shown in FIG. 2 to release cover 50 from end cap 34, and then end cap 50 is removed, followed by removal of filter, media 38 axially rightwardly in FIGS. 1 and 5 from inner liner 22. Filter media 38 may then be cleaned, if no replacement filter media is available, and reinserted axially leftwardly onto inner liner 22. Alternatively, new replacement filter media may be inserted if available. Cover 50 is then reinstalled by mounting it to end cap 34, to retain filter media 38 in place.

Present Invention

The present invention arose during cost reduction efforts, including elimination of the extra piece of foam 44, FIGS. 1, 5, otherwise required for sealing, and elimination of tab 48 and the twist and lock fastening requirement, including the welding operation securing tab 48 to end cap 34 or some other molding process if a plastic end cap 34 were to be used.

FIGS. 6–10 show an air filter element 60 in accordance with the invention. Cylindrical inner liner 62, e.g. wire mesh or screen or perforated metal, is pervious to air flow and extends axially along an axis 64, FIGS. 10, 11, between distally opposite first and second axial ends 66 and 68, and has a hollow interior 70. First and second distally opposite end caps 72 and 74 are mounted to inner liner 62 at ends 66 and 68, respectively. End cap 72 is preferably a compressible urethane member molded on end 66 of inner liner 62. The inner liner is potted into the urethane in liquefied form, after which the urethane is allowed to solidify to form end cap 72. End cap 74 is preferably a rigid hard urethane member molded on end 68 of inner liner 62. The inner liner is potted into the urethane in liquefied form, after which the urethane solidifies to form end cap 74. The urethane used for end cap 74 is denser than the urethane used for end cap 72. It is known in the prior art to vary the density of the urethane to in turn control the rigidity of the formed member, for example lesser density urethane for flexible compressible end cap 72, and greater density urethane for rigid end cap 74. End cap 72 has a central aperture 76 providing air flow therethrough in communication with hollow interior 70. End cap 74 spans and closes hollow interior 70. Filter media 78 is provided by a cylindrical foam sleeve, which may comprise two layers 80, 82, extending axially between distally opposite first and second axial ends 84 and 86 and axially slidable along and around inner liner 62 from either of the axial ends 84 and 86 of sleeve 78.

Sleeve 78 is open at each axial end 84 and 86 and has an inner diameter at each axial end permitting axial sliding of each of the axial ends 84 and 86 along inner liner 62. Filter element 60 has two installation modes, namely a first mode with axial end 84 of sleeve 78 axially slid leftwardly in FIGS. 6, 8, 10, 11, past second end cap 74 and along inner liner 62, and a second mode with reversed orientation, namely with second axial end 86 of sleeve 78 axially slid leftwardly in FIGS. 6, 8, 10, 11 past second end cap 74 and along inner liner 62. Sleeve 78 does not have a foam cap or spanning disc such as 44 in FIGS. 1–5. Hence, either end 84 or 86 of sleeve 78 may be the lead end axially slid onto and along inner liner 62.

A cover 88, FIGS. 8–10, is removably mounted to end cap 74 and engages axial end 86 of sleeve 78 and axially retains the sleeve. Sleeve 78 has an inner surface 90, FIG. 9, facing radially inwardly toward and engaging inner liner 62, and an outer surface 92 facing radially outwardly and spaced radially outwardly of inner surface 90 by a given radial dimension. Cover 88 has a pair of annular ribs 96 and 98, FIG. 8, extending axially leftwardly, FIGS. 8–11, toward end cap 72. Rib 96, FIG. 11, engages inner surface 90 of sleeve 78 and extends axially between inner liner 62 and inner surface 90 of sleeve 78. Rib 98 is spaced radially outwardly of rib 96 by the noted given radial dimension 94 and engages outer surface 92 of sleeve 78 and extends axially therealong. A fence 100, FIG. 11, is secured to inner liner 62, by being potted therewith or being welded thereto, and has a first flange 102 extending radially outwardly from inner liner 62 between sleeve 78 and end cap 72, and a second flange 104 extending axially from first flange 102 toward end cap 74 along the outside of sleeve 78, to keep the foam sleeve end 84 in place. Foam sleeve end 86 is kept in place by cover 88. In some embodiments, fence 100 is omitted. In some embodiments, inner rib 96 is omitted.

End cap 74 has a central aperture 106, FIG. 10, retaining closing cover 88. Filter media sleeve 78 extends axially along inner liner 62 and is axially retained between cover 88 and end cap 72, and fence 100 if used. Cover 88 is removably mounted to end cap 74 at aperture 106. End cap 74 spans and closes hollow interior 70 at axial end 68 of inner liner 62, with cover 88 closing aperture 106 in end cap 74. End cap 72 has a radial thickness between inner and outer diameters, the inner diameter defining aperture 76 and being substantially the same as the diameter of inner liner 62. End cap 74 has a radial thickness between inner and outer diameters, the inner diameter defining aperture 106, and the outer diameter being substantially the same as the diameter of inner liner 62. Sleeve 78 has the noted radial thickness between inner and outer diameters at the noted inner and outer surfaces 90 and 92. Cover 88 extends radially outwardly beyond end cap 74 by a radial dimension substantially equal to the noted radial thickness between surfaces 90 and 92.

Cover 88 is removably mounted to end cap 74 in snap-in relation and axially retains sleeve 78 on inner liner 62. Sleeve 78 is axially retained between end cap 72 and cover 88. Cover 88 radially retains the sleeve outwardly of liner 62 by retaining sleeve end 86 between ribs 96 and 98. Cover 88 is inserted axially, as shown at arrow 108, FIGS. 8, 9, onto end cap 74 in snap-in relation. Cover 88 has a shank 110 extending axially toward end cap 72. The shank has a detent 112 received in aperture 106 in end cap 74 in snap-fit relation. A resiliently compressible sealing grommet 114, FIG. 9, is provided in aperture 106, and detent 112 is provided by a raised shoulder on shank 110 which compresses the grommet as cover 88 is inserted axially onto end cap 74, with the shoulder 112 snapping-in behind grommet 114 in hollow interior 70. The snap-fit mounting provides axial sealing bias axially sealing sleeve 78 at its axial ends 84 and 86. A lubricant may be applied to the inside diameter of grommet 114, which is preferably rubber, to aide removal of cover 88 from end cap 74, to facilitate servicing.

To service filter element 60, cover 88 is axially removed rightwardly, FIGS. 8–11, from end cap 74, with detent shoulder 112 compressing grommet 114 during such removal, followed by removal of sleeve 78 axially rightwardly along the outer surface of inner liner 62. Sleeve 78 may then be cleaned, if a new replacement sleeve is not available, and then reinserted onto the filter element by sliding the sleeve axially leftwardly along inner liner 62, with either end 84 or 86 being the lead end, and then reinserting cover 88 axially leftwardly onto end cap 74 in the noted snap-fit relation. Alternatively, if a new replacement sleeve is available, it can instead be installed on inner liner 62 to replace the removed dirty sleeve.

FIGS. 12 and 13 show a filter housing 120 in which filter element 60 can be used. The housing includes a receptacle base 122 closed by a cover 124. End cap 72 of filter element 60 is received within and circumscribed by an annular flange 126, FIG. 13, forming a radial seal at the outer annular surface of end cap 72. Cover 88 rests on notched support ledge 128 of a vertically extending wall 130 in receptacle base 122. The upper surface of wall 130 is sloped at 132, to facilitate installation of filter element 60 into the housing, namely by angling the filter element 60 downwardly into receptacle base 122 and sliding cover 88 diagonally downwardly and leftwardly in FIG. 13 as end cap 72 is slid into engagement with circumscribing annular flange 126. Incoming dirty air flows through cover inlet 134 into the housing and then radially inwardly through sleeve 78 and inner liner 62 into hollow interior 70 as shown at arrows 136, FIGS. 11, 13, and then axially leftwardly through central aperture 76 in end cap 72 and then exits through housing outlet 138. In an alternate embodiment, a reverse flow or inside-out filter may be provided wherein the noted flow direction is reversed.

It is recognized that various equivalents, alternatives and modifications are possible within the scope of the appended claims.

What is claimed is:

1. An air filter element comprising a cylindrical inner liner pervious to air flow and extending axially along an axis between distally opposite first and second axial ends and having a hollow interior, first and second distally opposite end caps each permanently mounted to said inner liner at said first and second ends, respectively, said first end cap having a central aperture providing air flow therethrough in communication with said hollow interior, said second end cap closing said hollow interior, filter media comprising a removable and serviceable cylindrical sleeve extending axially between distally opposite first and second axial ends and axially slidable along and around said inner liner from either of said first and second axial ends of said sleeve.

2. The invention according to claim 1 wherein said sleeve is open at each axial end and has an inner diameter at each axial end permitting axial sliding of each of said axial ends of said sleeve along said inner liner.

3. The invention according to claim 2 wherein said filter element in combination with said sleeve comprises two installation modes, comprising a first mode with said first axial end of said sleeve axially slid past said second end cap and along said inner liner, and a second mode with said second axial end of said sleeve axially slid past said second end cap and along said inner liner.

4. The invention according to claim 3 comprising a cover removably mounted to said second end cap and engaging one of said axial ends of said sleeve and axially retaining said sleeve, said sleeve having an inner surface facing radially inwardly towards said liner, and having an outer surface facing radially outwardly and spaced radially outwardly of said inner surface, said cover having an annular rib engaging said outer surface of said sleeve and extending axially therealong.

5. The invention according to claim 3 comprising a cover removably mounted to said second end cap and engaging one of said axial ends of said sleeve and axially retaining said sleeve, said sleeve having an inner surface facing radially inwardly toward said inner liner, and having an outer surface facing radially outwardly and spaced radially outwardly of said inner surface by a given radial dimension, said cover having a pair of annular ribs extending axially toward said first end cap comprising a first rib engaging said inner surface of said sleeve and extending axially between said inner liner and said inner surface of said sleeve, and a second rib spaced radially outwardly of said first rib by said given radial dimension and engaging said outer surface of said sleeve and extending axially therealong.

6. The invention according to claim 1 comprising a fence secured to said inner liner and having a first flange extending radially outwardly from said inner liner between said sleeve and said first end cap, and a second flange extending axially from said first flange toward said second end cap along the outside of said sleeve.

7. An air filter element comprising a cylindrical inner liner pervious to air flow and extending axially along an axis between distally opposite first and second axial ends and having a hollow interior, first and second distally opposite end caps mounted to said inner liner at said first and second ends, respectively, each end cap having a central aperture, the aperture in said first end cap providing air flow therethrough in communication with said hollow interior, the aperture in said second end cap retaining a closing cover, said cover being removably mounted to and engaging the exterior of said second end cap, filter media comprising a cylindrical sleeve extending axially along said inner liner and axially retained between said cover and said first end cap.

8. The invention according to claim 7 wherein said cover is removably mounted to said second end cap at said aperture in said second end cap.

9. The invention according to claim 8 wherein said second end cap closes said hollow interior at said second end of said inner liner, with said cover closing said aperture in said second end cap.

10. The invention according to claim 9 wherein said first end cap has a radial thickness between inner and outer diameters, said inner diameter defining said aperture in said first end cap and being substantially the same as the diameter of said inner liner.

11. The invention according to claim 9 wherein said second end cap has a radial thickness between inner and outer diameters, said inner diameter defining said aperture in said second end cap, said outer diameter being substantially the same as the diameter of said inner liner.

12. The invention according to claim 9 wherein said sleeve has a radial thickness between inner and outer diameters, and wherein said cover extends radially outwardly beyond said second end cap by a radial dimension substantially equal to said radial thickness.

13. The invention according to claim 9 wherein said first end cap has a radial thickness between inner and outer diameters, said inner diameter defining said aperture in said first end cap and being substantially the same as the diameter of said inner liner, said second end cap has a radial thickness between inner and outer diameters, said inner diameter of said second end cap defining said aperture in said second end cap, said outer diameter of said second end cap being substantially the same as the diameter of said inner liner, said sleeve has a radial thickness between inner and outer diameters, and wherein said cover extends radially outwardly beyond said second end cap by a radial dimension substantially equal to said radial thickness.

14. The invention according to claim 9 comprising a fence secured to said inner liner and having a first flange extending radially outwardly from said inner liner between said sleeve and said first end cap, and a second flange extending axially from said first flange toward said second end cap along the outside of said sleeve.

15. An air filter element comprising a cylindrical inner liner pervious to air flow and extending axially along an axis between distally opposite first and second axial ends and having a hollow interior, first and second distally opposite end caps mounted to said inner liner at said first and second ends, respectively, said first end cap having a central aperture providing air flow therethrough in communication with said hollow interior, said second end cap closing said hollow interior, filter media comprising a cylindrical sleeve extending axially between distally opposite first and second axial ends and axially slidable along and around said inner liner, a cover removably mounted to said second end cap in snap-in relation and axially retaining said sleeve on said inner liner.

16. The invention according to claim 15 wherein said sleeve is axially retained between said first end cap and said cover.

17. The invention according to claim 15 wherein said cover radially retains said sleeve outwardly of said liner.

18. The invention according to claim 17 wherein said cover has a rib extending axially along the outside of said sleeve and retaining said sleeve outwardly of said liner.

19. The invention according to claim 17 wherein said cover has a first rib extending axially between said sleeve and said inner liner, and a second rib spaced radially outwardly of said first rib and extending axially along the outside of said sleeve, wherein said cover radially retains said sleeve outwardly of said liner by retaining said sleeve between said ribs.

20. The invention according to claim 15 wherein said cover is inserted axially onto said second end cap in said snap-in relation.

21. The invention according to claim 20 wherein said second end cap has an aperture therethrough, and wherein said cover has a shank extending axially toward said first end cap, said shank having a detent received in said aperture in said second end cap in snap-fit relation.

22. The invention according to claim 21 comprising a resiliently compressible sealing grommet in said aperture, and wherein said detent comprises a raised shoulder on said shank compressing said grommet as said cover is inserted axially onto said second end cap, said shoulder snapping-in behind said grommet in said hollow interior.

23. A method for servicing an air filter element by replacing filter media, comprising providing an air filter element having a cylindrical inner liner pervious to air flow and extending axially along an axis between distally opposite first and second axial ends and having a hollow interior, providing first and second distally opposite end caps each permanently mounted to said inner liner at said first and second ends, respectively, providing said first end cap with a central aperture providing air flow therethrough in communication with said hollow interior, providing said second end cap closing said hollow interior, providing filter media comprising a cylindrical sleeve extending axially between distally opposite first and second axial ends and axially slidable along and around said inner liner from either of said first and second axial ends of said sleeve, servicing said air filter element by removing said filter media sleeve when dirty by axially sliding said sleeve along said inner liner, and replacing the dirty filter media sleeve with a clean filter media sleeve by inserting said clean sleeve onto said inner liner from either axial end of said sleeve and axially sliding said sleeve along said inner liner.

24. The method according to claim 23 comprising cleaning the removed dirty filter media sleeve to provide a cleaned filter media sleeve, and providing said cleaned filter media sleeve as said clean sleeve and inserting same back onto said inner liner, to enable re-use of said filter media sleeve.

25. The method according to claim 23 wherein said sleeve is open at each axial end and has an inner diameter at each axial end permitting axial sliding of each of said axial ends of said sleeve along said inner liner.

26. The method according to claim 25 wherein said filter element in combination with said sleeve comprises two installation modes, comprising a first mode with said first axial end of said sleeve axially slid past said second end cap and along said inner liner, and a second mode with said second axial end of said sleeve axially slid past said second end cap and along said inner liner.

27. The method according to claim 26 comprising providing a cover, and removably mounting said cover to second end cap to engage one of said axial ends of said sleeve and axially retain said sleeve, servicing said air filter element by removing said cover from said second end cap prior to removal of said sleeve from said inner liner, and then inserting said clean sleeve onto said inner liner and then mounting said cover to said second end cap, providing said sleeve with an inner surface facing radially inwardly toward said inner liner, and an outer surface facing radially outwardly and spaced radially outwardly of said inner surface, providing said cover with an annular rib engaging said outer surface of said sleeve and extending axially therealong, and comprising mounting said cover to said second end cap to retain said sleeve radially between said rib and said inner liner and axially between said cover and said first end cap.

28. The method according to claim 26 comprising providing a cover, and removably mounting said cover to said second end cap to engage one of said axial ends of said sleeve and axially retain said sleeve, servicing said air filter element by removing said cover from said second end cap prior to removal of said sleeve from said inner liner, and then inserting said clean sleeve onto said inner liner and then mounting said cover to said second end cap, providing said sleeve with an inner surface facing radially inwardly toward said inner liner, and an outer surface facing radially outwardly and spaced radially outwardly of said inner surface by a given radial dimension, providing said cover with a pair of annular ribs extending axially toward said first end cap, including a first rib engaging said inner surface of said sleeve and extending axially between said inner liner and said inner surface of said sleeve, and a second rib spaced radially outwardly of said first rib by said given radial dimension and engaging said outer surface of said sleeve and extending axially therealong, and comprising mounting said cover to said second end cap to retain said sleeve radially between said ribs and axially between said cover and said first end cap.

29. The method according to claim 23 comprising retaining the axial end of said sleeve at said first end cap by providing a fence secured to said inner liner and having a first flange extending radially outwardly from said inner liner between said sleeve and said first end cap, and a second flange extending axially from said first flange toward said second end cap along the outside of said sleeve.

30. The method according to claim 23 comprising providing an aperture in said second end cap, and removably mounting a cover to said second end cap at said aperture to axially retain said sleeve along said inner liner between said cover and said first end cap.

31. The method according to claim 30 comprising closing said hollow interior at said second end of said inner liner with said second end cap, and closing said aperture in said second end cap with said cover.

32. The method according to claim 23 comprising removably mounting a cover to said second end cap in snap-in relation and axially retaining said sleeve on said inner liner.

33. The method according to claim 32 comprising providing said cover with an axially extending rib, and mounting said cover to said second end cap in said snap-in relation such that said rib extends axially along the outside of said sleeve and retains said sleeve outwardly of said liner.

34. The method according to claim 32 comprising providing said cover with first and second axially extending ribs radially spaced from each other, and mounting said cover to said second end cap in said snap-in relation such that said first rib extends axially between said sleeve and said inner liner, and said second rib extends axially along the outside of said sleeve, such that said cover radially retains said sleeve outwardly of said liner by retaining said sleeve between said ribs.

35. The method according to claim 32 comprising installing said cover by inserting same axially onto said second end cap in said snap-in relation.

36. An air filter comprising a cylindrical inner liner pervious to air flow and extending axially along an axis between distally opposite first and second axial ends and having a hollow interior, first and second distally opposite end caps mounted to said inner liner at said first and second ends, respectively, said first end cap having a central aperture providing air flow therethrough in communication with said hollow interior, said second end cap closing said hollow interior, filter media comprising a cylindrical sleeve extending axially between distally opposite first and second axial ends and axially slidable along and around said inner liner, a cover removably mounted to said end cap in snap-in relation and engaging the exterior of said end cap and axially retaining said sleeve on said inner liner.

* * * * *